United States Patent [19]
Sugimoto

[11] 3,871,191
[45] Mar. 18, 1975

[54] GEARED TYPE SHAFT COUPLING

[75] Inventor: Kuniyoshi Sugimoto, Yokohama, Japan

[73] Assignee: Kabushiki Kaisha Hasegawa Haguruma, Tokyo, Japan

[22] Filed: July 5, 1973

[21] Appl. No.: 376,440

[30] Foreign Application Priority Data
July 7, 1972 Japan................................ 47-79671

[52] U.S. Cl........................................ 64/9 R, 64/6
[51] Int. Cl................................................ F16d 3/18
[58] Field of Search.................... 64/9 A, 9 R, 14, 6

[56] References Cited
UNITED STATES PATENTS
| | | | |
|---|---|---|---|
| 1,683,999 | 9/1928 | Sykes | 64/9 A |
| 1,861,364 | 5/1932 | Schreck | 64/9 A |
| 2,608,071 | 8/1952 | Baudry | 64/9 A |
| 3,613,395 | 11/1971 | Shigeura | 64/9 R |
| 3,712,080 | 1/1973 | Shigeura | 64/9 R |

*Primary Examiner*—Samuel Scott
*Assistant Examiner*—R. Heald
*Attorney, Agent, or Firm*—Oldham & Oldham

[57] ABSTRACT

A geared shaft coupling including a casing split into two halves of identical configuration and a ring tightly fitted in an annular groove of rectangular cross section formed inside the casing at the junction between the two halves thereof. The ring not only serves to keep the casing halves in axial alignment with each other but also to maintain a sealing relationship therebetween. Among the advantages over the prior art are: simpler construction, lower cost of manufacture, increased ease of assembling and interchangeability of casing parts.

3 Claims, 4 Drawing Figures

GEARED TYPE SHAFT COUPLING

BACKGROUND AND SUMMARY OF THE INVENTION

This invention relates to geared type shaft couplings including two interior hubs each secured to its respective shaft with circumferential gear teeth surrounded by a casing or sleeve having internal gear teeth to mesh and connect the two hubs. As is well known, the casing is split transversely into two halves, which are bolted together by means of flanges formed thereon.

Conventional forms of geared shaft coupling, however, have been unsatisfactory from the standpoint of manufacture and use on account of their structure including two casing halves made different in shape for interfitting engagement, one casing half being counterbored at its inner, abutting end to receive a complementary projection formed on the other casing half. Also, either half of the casing has been formed in its abutting end surface with an annular groove to receive seal means such as an Q-ring for preventing leakage of lubricating oil. Obviously, such structure has cost considerable time and labor to fabricate and lacked interchangeability of casing parts.

Accordingly, the present invention has for its object the provision of a new and inproved geared type shaft coupling which is simple in structure, easy to fabricate, convenient to use and functionally efficient.

BRIEF DESCRIPTION OF THE DRAWING

The present invention will now be described in detail with reference to the accompanying drawing, whih illustrates a preferred embodiment of the invention and, for comparison, a conventional form of geared coupling and in which.

DESCRIPTION OF THE PREFERRED EMBODIMENT

Figure 1:
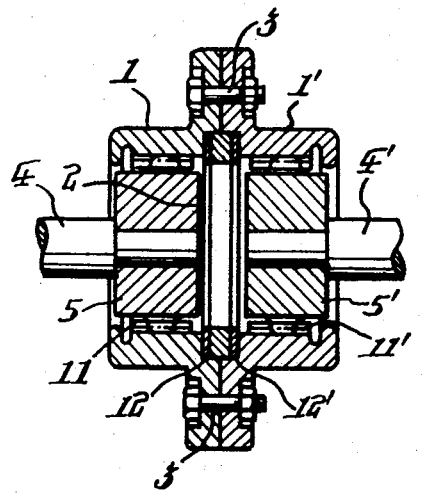
FIG. 1 is a longitudinal cross-sectional view of one embodiment of the present invention.

Referring to the drawing and first to FIG. 1, there is shown a geared shaft coupling embodying the present invention which includes a casing or sleeve transversely split into two halves or sleeve sections 1, 1'. Sleeve sections 1, 1' are each formed with internal gear teeth 11 in the conventional manner for meshing engagement with respective interior hubs 5, 5', which are formed with external gear teeth and keyed to respective shafts 4, 4' to be coupled. The two sleeve sections 1, 1' are each flanged to be joined together by bolt means 3.

Figure 2:
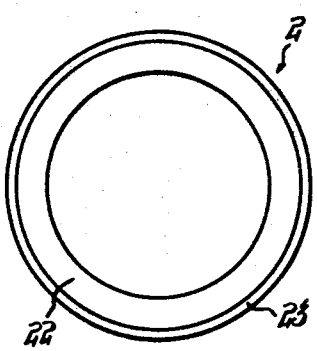
FIG. 2 is an enlarged side elevational view of the fitting ring shown in FIG. 1.
Figure 3:
FIG. 3 is a diametral cross-sectional view of same.

The two sleeve sections 1, 1' are of identical configuration with abutting annnular disc 21 of rectangular cross section formed of metal or other hard material having an external diameter substantially equal to the bottom diameter of the annular groove 12-12' to closely fit therein. A pair of annular gaskets 22, 22' of an elastic material such as rubber are bonded to the opposite sides of the annular disc 21 as by adhesive means. The gaskets 22, 22' are each beveled on its outer edge as indicated at 23 in FIGS. 2 and 3. Moreover, the gaskets 22 are generally of a flat shape and have inner and outer diameters which are substantially the same as that of ring 2 as clearly set forth in FIGS. 1 and 3.

In assembling the shaft coupling of the present invention, the two counterbored sleeve sections 1, 1' are joined together by bolt and nut means 3 with ring member 2 fitted in the annular groove defined between the sleeve sections. As will readily be understood, the sleeve sections when thus joined together are brought together into exact axial alignment with each other along the cylindrical peripheral surface of the disc 21, which is closely fitted in the annular slots or counterbores 12, 12' of the respective sleeve sections. Meanwhile, the radially extending bottom surfaces of counterbores 12, 12' are tightly pressed against the respective gaskets 22, 22' for sealing engagement therewith so that any leakage of lubricant material through the junction between the sleeve sections can be positively prevented.

It is to be noted at this point that the ring member 2 should have a total thickness more or less larger than the width of the annular groove in the sleeve, which is twice the axial depth of the respective counterbores 12, 12' formed in sleeve sections 1, 1', so that the gaskets 22, 22' on the opposite sides of the ring member 2 can be compressed enough to obtain the desired sealing effect when the sleeve sections are tightly joined together. Since almost all of the force for tightening the two sleeve sections are applied on and received at the abutting faces of the sleeve sections, the ring member 2 will not directly receive the tightening force caused by the bolt and nut means. In other words, the ring member is compressed by an amount determined by a differennce between the total thickness of the ring member and the depth of the annular groove 12 and 12'. Therefore, the ring member is not destroyed due to any excessive compression which would otherwise take place. Furthermore, the outer peripheral surface of the disc 21 contributes to the correct positioning of the ring member in the annular groove 12, 12', and also to its ability to with stand the axial outward force (centrifugal force). The presence of such disc 21 also facilitates the handling of the ring member in assembling of the coupling. The bevelled formation 23 of the gaskets serves effectively to accommodate elastic deformation of the packing material under such compression and prevent occurrence of any excessive stress therein.

Figure 4:
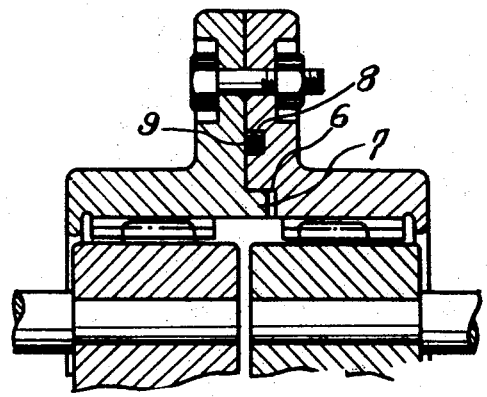
FIG. 4 is a fragmentary longitudinal cross section illustrating a conventional form of geared shaft coupling for comparison.

FIG. 4 illustrates a conventional form of geared shaft coupling for the purpose of comparison. As shown, one of the sleeve sections is counterbored as at 6 to receive an annular projection 7 formed on the abutting end surface of the other sleeve section around the inner periphery thereof to serve the purpose of axially aligning the sleeve sections with each other. In order to prevent leakage of lubricant oil through the junction between the sleeve sections, one of the sleeve sections is formed in its abutting end surface with an annular groove 8 to receive an Q-ring therein. Such casing structure has entailed considerable manufacturing cost and inconvenience in use, not to say of lack of interchangeability of casing or sleeve parts.

In contrast, according to the present invention, the coupling sleeve or casing is formed, as described hereinbefore, of a pair of sleeve sections of identical configuration jointly defining an annualr groove around the inner periphery thereof and in this groove is fitted a ring member adapted to serve the purposes of aligning the sleeve sections and sealing against leakage of lubricant. As will readily be appreciated, the geared coupling of the present can be readily assembled just by joining together the sleeve sections with the ring member 2 fitted therebetween and with the particular advantage that exact axial alignment of the sleeve sections and dependable sealing against lubricating oil are automatically obtained. This affords much convenience in use of the shaft coupling while at the same time ensuring good performance and lubrication thereto. It does without saying that the sleeve or casing sections of identical configuration are freely interchangeable adding to the convenience in use and maintenance of such shaft coupling. Also, the simplified structure of the shaft coupling of the invention enables efficient production and substantial reduction in cost.

Though one preferred embodiment of the present invention has been shown and described, it is to be understood that various changes and modifications may be made therein without departing from the spirit and scope of the invention as defined in the appended claims.

What is claimed is:

1. A geared type shaft coupling comprising two interior hubs secured to respective shafts and each having external gear teeth, a sleeve transversely split into two sections of identical configuration having internal gear teeth for meshing engagement with said respective interior hubs, means for securing said two sleeve sections together in axially abutting relation to each other, said sleeve sections being counterbored at the abutting ends thereof to the same axial depth and diameter jointly to define an annular groove of rectangular cross section around the inner periphery of said sleeve midway of its axial length, and a ring member closely fitted in said annular groove and comprised of a flat annular disc of hard material having an external diameter substantially equal to the diameter of said annular groove, and a pair of annular flat gaskets bonded to the opposite sides of said annular disc, each of said gaskets made of an elastic material, each said gasket having an inner and an outer diameter substantially equal to the inner and outer diameter of the discs, said ring member having a total thickness slightly larger than twice the axial depth of the counterbore in each of said sleeve sections, and said annular gaskets are each beveled on its outer edge.

2. A geared type shaft coupling comprising two interior hubs secured to respective shafts and each having external gear teeth, a sleeve transversely split into two sections of identical configuration having internal gear teeth for meshing engagement with said respective interior hubs, means for securing said two sleeve sections together in axially abutting relation to each other, said sleeve sections being counterbored at the abutting ends thereof to the same axial depth and diameter jointly to define an annular groove of rectangular cross section around the inner periphery of said sleeve midway of its axial length, and a ring member closely fitted in said annular groove and comprised of a flat annular disc of hard material having an external diameter substantially equal to the diameter of said annular groove and a pair of annular gaskets bonded to the opposite sides of said annular disc, said ring member has a total thickness larger than twice the axial depth of the counterbore in each of said sleeve sections, said annular gaskets are of the same thickness to center said disc axially of the couplings, and said disc is made of metal.

3. A geared type shaft coupling comprising two interior hubs secured to respective shafts and each having external gear teeth, a sleeve transversely split into two sections of identical configuration having internal gear teeth for meshing engagement with said respective interior hubs, means for securing said two sleeve sections together in axially abutting relation to each other, said sleeve sections being counterbored at the abutting ends thereof to the same axial depth and diameter jointly to define an annular groove of rectangular cross section around the inner periphery of said sleeve midway of its axial length, and a ring member closely fitted in said annular groove and comprised of a flat annular disc of hard material having an external diameter substantially equal to the diameter of said annular groove, and a pair of annular flat gaskets bonded to the opposite sides of said annular disc, each of said gaskets made of an elastic material, each said gasket having an inner and an outer diameter substantially equal to the inner and the outer diameter of the discs, said ring member having a total thickness slightly larger than twice the axial depth of the counterbore in each of said sleeve sections, and said annular disc engages both of said sleeve sections.

* * * * *